(12) United States Patent
Solomon et al.

(10) Patent No.: US 11,763,268 B2
(45) Date of Patent: Sep. 19, 2023

(54) METHOD AND SYSTEM TO IMPROVE DRIVER INFORMATION AND VEHICLE MAINTENANCE

(71) Applicant: MUNIC, Villejuif (FR)

(72) Inventors: Aaron Solomon, Villejuif (FR); Clément Pantin, Bougival (FR); Julien Zarka, Paris (FR)

(73) Assignee: MUNIC, Villejuif (FR)

( * ) Notice: Subject to any disclaimer, the term of this patent is extended or adjusted under 35 U.S.C. 154(b) by 211 days.

(21) Appl. No.: 17/042,428

(22) PCT Filed: Mar. 28, 2018

(86) PCT No.: PCT/IB2018/000414
§ 371 (c)(1),
(2) Date: Sep. 28, 2020

(87) PCT Pub. No.: WO2019/186221
PCT Pub. Date: Oct. 3, 2019

(65) Prior Publication Data
US 2021/0081907 A1    Mar. 18, 2021

(51) Int. Cl.
*G06Q 10/20* (2023.01)
*G06Q 30/0241* (2023.01)
(Continued)

(52) U.S. Cl.
CPC .............. *G06Q 10/20* (2013.01); *B60K 35/00* (2013.01); *B60R 16/0234* (2013.01);
(Continued)

(58) Field of Classification Search
CPC .............................. G06Q 40/00; G06Q 50/00
(Continued)

(56) References Cited

U.S. PATENT DOCUMENTS 6,324,516 B1 * 11/2001 Shults ................... G06Q 10/10
                                                              705/2
6,535,855 B1 *  3/2003 Cahill .................... G06Q 20/00
                                                              705/346
(Continued)

OTHER PUBLICATIONS

International Search Report and Written Opinion dated Dec. 6, 2018 in corresponding International Application No. PCT/IB2018/000414; 10 pages.

*Primary Examiner* — Kirsten S Apple
(74) *Attorney, Agent, or Firm* — Maier & Maier, PLLC

(57) ABSTRACT

A method carried out in a system having a diagnosis plug-in device, a host server, a plurality of third-party servers and a user display device. The method includes the steps of: coupling the diagnosis plug-in device to the diagnosis port of a vehicle of interest; collecting at the diagnosis plug-in device, a basic data set, including vehicle speed, itinerary and geolocations; transferring the basic data set to the host server; at the host server, enriching a driver's profile relating and updating the vehicle's data history; forwarding the basic data set from the host server to the third-party servers; at the third-party servers, enriching the driver's profile and/or updating the vehicle's data history; at each third-party server, deciding based on a set of message issuance criteria to build a message for the user and conditions of delivery of this message concerning vehicle maintenance and/or advertisement messages.

14 Claims, 4 Drawing Sheets

(51) Int. Cl.
*G06Q 30/0283* (2023.01)
*G06Q 40/08* (2012.01)
*G06Q 50/26* (2012.01)
*G06F 16/23* (2019.01)
*B60K 35/00* (2006.01)
*B60R 16/023* (2006.01)
*G06Q 30/018* (2023.01)
*G07B 15/02* (2011.01)
*G07C 5/00* (2006.01)
*G07C 5/08* (2006.01)
*H04L 51/42* (2022.01)

(52) U.S. Cl.
CPC .......... *G06F 16/23* (2019.01); *G06Q 30/018* (2013.01); *G06Q 30/0277* (2013.01); *G06Q 30/0284* (2013.01); *G06Q 40/08* (2013.01); *G06Q 50/26* (2013.01); *G07B 15/02* (2013.01); *G07C 5/006* (2013.01); *G07C 5/008* (2013.01); *G07C 5/0808* (2013.01); *H04L 51/42* (2022.05); *B60K 2370/152* (2019.05); *B60R 2370/16* (2019.05)

(58) Field of Classification Search
USPC .......................................................... 705/38
See application file for complete search history.

(56) References Cited

U.S. PATENT DOCUMENTS

| | | | |
|---|---|---|---|
| 6,754,485 B1* | 6/2004 | Obradovich | H04L 67/12 340/7.52 |
| 6,826,536 B1* | 11/2004 | Forman | G06Q 10/10 705/3 |
| 6,934,692 B1* | 8/2005 | Duncan | G06Q 20/10 705/26.25 |
| 7,340,401 B1* | 3/2008 | Koenig | G06Q 40/08 600/300 |
| 7,356,516 B2* | 4/2008 | Richey | G06Q 30/0253 705/16 |
| 7,395,219 B2* | 7/2008 | Strech | G06Q 40/00 705/4 |
| 7,467,094 B2* | 12/2008 | Rosenfeld | G06Q 30/04 340/539.18 |
| 7,657,441 B2* | 2/2010 | Richey | G06Q 20/403 705/30 |
| 8,140,418 B1* | 3/2012 | Casey | G06Q 40/02 709/227 |
| 8,311,941 B2* | 11/2012 | Grant | G06Q 20/40 705/40 |
| D764,461 S* | 8/2016 | Romanoff | D14/453 |
| 9,864,957 B2* | 1/2018 | Rennie | G06Q 50/10 |
| 9,892,463 B1* | 2/2018 | Hakimi-Boushehri | G06Q 30/0278 |
| 9,928,553 B1* | 3/2018 | Harvey | G06Q 40/08 |
| 10,057,664 B1* | 8/2018 | Moon | G08B 25/006 |
| 10,181,080 B2* | 1/2019 | Schultz | B60R 1/00 |
| 2002/0004747 A1* | 1/2002 | Nishioka | G06Q 30/0265 705/14.62 |
| 2003/0107548 A1 | 6/2003 | Eun et al. | |
| 2003/0167110 A1* | 9/2003 | Smith | G08G 5/0043 701/31.4 |
| 2003/0233292 A1* | 12/2003 | Richey | G06Q 40/12 705/28 |
| 2004/0153382 A1* | 8/2004 | Boccuzzi | H04M 15/73 705/34 |
| 2006/0271456 A1* | 11/2006 | Romain | G06Q 40/00 705/67 |
| 2008/0059351 A1* | 3/2008 | Richey | G06Q 20/20 705/35 |
| 2009/0164082 A1* | 6/2009 | Kobayashi | B60K 31/0008 701/96 |
| 2009/0265193 A1* | 10/2009 | Collins | G06Q 30/0185 901/46 |
| 2010/0027777 A1* | 2/2010 | Gupta | H04M 3/42195 379/210.01 |
| 2011/0173122 A1* | 7/2011 | Singhal | G06Q 20/42 705/44 |
| 2011/0213628 A1* | 9/2011 | Peak | G06Q 40/08 705/4 |
| 2011/0218827 A1* | 9/2011 | Kenefick | G06Q 40/08 705/4 |
| 2011/0238564 A1* | 9/2011 | Lim | G06Q 20/3223 705/38 |
| 2011/0276489 A1* | 11/2011 | Larkin | G06Q 20/40 705/44 |
| 2012/0046973 A1* | 2/2012 | Eshleman | G06Q 40/08 705/500 |
| 2012/0047072 A1* | 2/2012 | Larkin | G06Q 20/3255 705/44 |
| 2012/0066005 A1* | 3/2012 | Stewart | G06Q 30/0282 705/4 |
| 2012/0116820 A1* | 5/2012 | English | G06Q 40/08 705/4 |
| 2012/0275651 A1* | 11/2012 | Brown | G06Q 40/08 382/103 |
| 2012/0330690 A1* | 12/2012 | Goslinga | G06Q 40/00 705/4 |
| 2013/0073321 A1* | 3/2013 | Hofmann | G06Q 10/10 705/4 |
| 2013/0166325 A1* | 6/2013 | Ganapathy | G06Q 40/08 705/4 |
| 2013/0226667 A1* | 8/2013 | Terrazas | G06Q 30/0205 705/7.34 |
| 2013/0246135 A1 | 9/2013 | Wang | |
| 2013/0262029 A1* | 10/2013 | Pershing | G01B 21/28 702/156 |
| 2013/0304514 A1* | 11/2013 | Hyde | G06Q 40/08 705/4 |
| 2013/0325541 A1* | 12/2013 | Capriotti | G06Q 10/087 705/7.21 |
| 2014/0040434 A1 | 2/2014 | Rybak et al. | |
| 2014/0058854 A1* | 2/2014 | Ranganath | G06Q 20/405 705/16 |
| 2014/0257871 A1* | 9/2014 | Christensen | G06Q 40/08 705/4 |
| 2014/0310162 A1* | 10/2014 | Collins | G06Q 40/08 707/769 |
| 2014/0310186 A1* | 10/2014 | Ricci | G06V 40/172 705/302 |
| 2015/0032480 A1* | 1/2015 | Blackhurst | G06Q 40/08 705/4 |
| 2015/0187019 A1* | 7/2015 | Fernandes | G06Q 40/08 705/4 |
| 2015/0294419 A1* | 10/2015 | Gonzalez Miranda | G06F 3/04842 701/31.6 |
| 2016/0132618 A1 | 5/2016 | Lovell | |
| 2016/0225198 A1 | 8/2016 | Punjabi et al. | |
| 2017/0046788 A1* | 2/2017 | Macciola | H04N 1/00251 |
| 2017/0236100 A1* | 8/2017 | Bayat | G06Q 10/20 705/305 |
| 2018/0012196 A1* | 1/2018 | Ricci | G06V 20/597 |
| 2018/0082496 A1 | 3/2018 | Rosenbaum | |
| 2018/0232707 A1* | 8/2018 | Angai | G06Q 10/20 |
| 2018/0285832 A1* | 10/2018 | Oz | G07C 5/008 |
| 2018/0357720 A1* | 12/2018 | Grant | G06Q 40/08 |

* cited by examiner

METHOD AND SYSTEM TO IMPROVE DRIVER INFORMATION AND VEHICLE MAINTENANCE

FIELD OF THE INVENTION

The present invention relates to methods and systems for improving driver information and vehicle maintenance.

BACKGROUND OF THE DISCLOSURE

Although recent vehicles exhibit generally good reliability record, such reliability relies on regular vehicle maintenance. In particular, some wear parts need to be replaced once they have reached their wear or lifetime, for example engine oil, tires, brake pads, timing belts, wiping blades, filament bulbs, etc. . . . . Even though the vehicle manufacturer gives a recommended maintenance schedule, it is beneficial to adapt maintenance intervals to the real wear status of the wear parts. The case of second hand vehicles is more critical since they are older and often serviced in multibrand service centers, while such vehicle owners are more concerned about ownership costs.

From another perspective, the regular driver of a vehicle and/or the proprietor/owner of the vehicle are keen to optimize the maintenance costs for said vehicle. They are looking forward to being aware of special offers from shops or service centers located in the surrounding areas.

It is also a wish of the driver of a vehicle and/or the owner of the vehicle to decrease all general running costs, like insurance, tolls, parking fees, overall cost of ownership.

It is also a wish of the driver to easily partition the trips made by the vehicle according to the purpose and type of the move: commute from home to work place and vice versa, business travel, private trip, leisure travel, etc . . . .

It is also a wish of the driver to be helped about the refueling of the vehicle when fuel autonomy or battery autonomy decreases. Current telematics solutions are not addressing correctly these requirements as they have been designed according to one unique (or very few) use case among the above.

The inventors have found that there remains a need to improve driver information and vehicle maintenance.

SUMMARY OF THE DISCLOSURE

According to one aspect of the present invention, it is disclosed a method carried out in a system comprising at least a diagnosis plug-in device (1), at least a host server (or set of servers in a cloud architecture for instance) (2), a plurality of third party servers (or set of servers in a cloud architecture for instance) (3) and at least a user display device (4), with a first data link (DL1) between the diagnosis plug-in device (1) and the host server (2), a second data link (DL2) between the host server (2) and the third party servers, and a third data link (DL3) between the host server and or the third party servers (3) and the user display device (4), the method comprising the following steps:

/a/ couple the diagnosis plug-in device to the diagnosis port (8) of a vehicle of interest, said vehicle of interest being usually driven by a user of interest, /b/ collect, over time, at the diagnosis plug-in device, a basic set of data (7) comprising vehicle parameters and route data, the basic set of data (7) including at least vehicle speed, itinerary and geolocations, /c/ transfer the basic set of data to the host server (2), /d1/ at the host server, enrich the user profile and update the vehicle data history of the vehicle of interest (this forms a cumulative database), /e1/ forward a respective portion of the basic set of data from the host server (2) respectively to each of the plurality of third party servers (3), /e2/ at the third party servers, enrich a third party user profile and update a third party vehicle data history of the vehicle of interest, /f/ at each particular third party server, make a decision, based on a set of message issuance criteria, said set of message issuance criteria including a user profile authorization to receive messages for said particular third party, to build a message for the user and conditions of delivery of this message, said message comprising a vehicle maintenance message and/or advertisement message, /g/ send said message to the user display device or to a user mailbox accessible by the user via the user display device.

Thanks to these dispositions, there are provided relevant helpful messages for the user (the user here being either the driver or the owner of the vehicle), this improves decision-making process from the user standpoint. This improves cost efficiency of vehicle maintenance service.

This also improves customer loyalty versus an advertising brand from one or more third party.

The proposed method also enables accurate collection of actual vehicle use for insurance purposes and the method can be configured to prompt feed-back(s) to user. The proposed method also enables more efficient car sharing possibilities. The proposed method also enables more efficient trading of second hand cars.

Vehicle data history database helps to predict next vehicle moves with a good level of predictability or likelihood.

In various embodiments of the invention, one may possibly have recourse in addition to one and/or other of the following arrangements, taken alone or in combination.

According to one particular option, the set of message issuance criteria may further include lookup tables and/or abacus, and can be based on at least one of the following information: vehicle current position, vehicle age, vehicle mileage, vehicle brand, vehicle powertrain type. Thereby, the relevance of messages can be enhanced, targetability of customers can be increased.

According to one particular option, the conditions of delivery of the message may be based on vehicle current geo-position, vehicle current status, time of the day, weather conditions, acknowledgement of previous message, geolocation of the user, or the like.

The delivery of messages can be done at the best moment for the user, and/or at best environmental conditions.

According to one particular option, the basic data set can further comprise driving style (braking force, acceleration), fuel level, fuel consumption, engine temperature, vehicle mileage, diagnosis trouble codes (DTCs), tires pressure, brake pads wear, traction battery state-of-health, traction battery state-of-charge, next service required, etc.

This information is useful for insurance companies, service repair centers, gas stations.

According to one particular option, wherein the basic data set can be at least partially time-stamped (moment within the day, within the week, within the month, . . . ).

Effective use of the vehicle can be known versus time of the day, moment of the week etc. Also the time periods when the vehicle is not used can be also identified, and can be relevant information for car pool/sharing companies or the like.

According to one particular option, the diagnosis plug-in device may collect an auxiliary data set (7) required on demand from a third-party (31); this can be a case of embedded third party software module downloaded in plug-in device.

Specific knowledge of a third party can be embodied in the plug-in device.

According to one particular option, the message concerns an approaching deadline to perform a maintenance operation on the vehicle, including regulatory compulsory service check.

This is helpful to comply with the vehicle maintenance requirements.

According to one particular option, wherein the message concerns an advertisement about vehicle general running costs, like insurance, tolls, parking fees, overall cost of ownership, fuel, etc . . . .

This helps the user to decrease the running costs of the vehicle.

According to one particular option, the message concerns an advertisement about special promotional business offer. The message can also include a rebate coupon under an electronic form.

This helps the user to decrease the running costs and maintenance costs of the vehicle.

According to one particular option, one third party is a tire manufacturer; whereby, precise knowledge of the wear condition of the tires can be deduced from the information collected by the plug-in device; also behaviour of the tires at the ground contact can be induced and this information can be made available to the driver of the fleet manager.

According to one particular option, one third party is an insurance company; therefore, insurance company can have precise knowledge of the actual use of vehicle and adapt therefrom the insurance fare.

According to one particular option, one third party is a second hand vehicle pricing company ('Argus' ™ or the like). Whereby the market value given to the second hand vehicle is really personalized and can reflect precisely the real state and past use of the vehicle.

According to one particular option, one third party is a vehicle renting website, notably a C-to-C (customer to customer) vehicle renting website ('Drivy' ™ or the like).

Generally speaking, a large number of third party companies can be involved in the promoted method. Among them, there can be technical third parties, and business third parties.

According to one particular option, the third party can be a goods trading company with on-site delivery such as Amazon™. The basic data set can further comprise information about ability to open the trunk of the vehicle with a private or encrypted method. In this case remote unlocking (or even opening) of the vehicle trunk enables to support features such as "Amazon Flex™", whereby a driver is offering a seamless transport service with his personal vehicle not implying any modification of his habits.

According to one particular option, the user display device (4) is a smartphone (41).

According to one particular option, the user display device (4) is a vehicle onboard multifunction display (42). Optionally, the messages sent to the user can be sent both to the smartphone and to the vehicle on-board multifunction display.

According to one particular option, it is considered to render the basic data set anonymous, i.e. the driver's name and personal data is replaced by dummy data or by void fields. Under such conditions, compliance with general data protection regulation ('GDPR' in short) can thus be achieved. Under this condition, no privacy data is transmitted to third parties, only data for statistical purpose is transmitted.

According to one particular option, it is considered to trace any third party server access to basic data set, i.e. any third party accesses are logged and made available to the user for each occurrence when the server has requested and/or received all or portion of basic data set. Thereby the user (driver or owner) has the possibility to monitor the use of his data and update the opt-in or opt-out selection/choice/option, in response to third party behavior. Update can be done selectively for each third party.

According to one particular option, it is considered to carry out an integrity securing mechanism from transferring information from host server (2) to third party servers (3) and/or for the whole data path from the diagnosis plug-in device (1) to the third party servers (3). Thereby data hacking and spoofing can be prevented.

The present invention also concerns a system comprising at least a diagnosis plug-in device (1), at least a host server (2), a plurality of third party servers (3) and at least a user display device (4), wherein the user (U) is defined as a driver (UD) and/or a owner (UP) of a vehicle of interest (51), with a first data link (DL1) between the diagnosis plug-in device (1) and the host server (2), a second data link (DL2) between the host server (2) and the third party servers, and a third data link (DL3) between the host server and/or the third party servers (3) and the user display device (4), the system being configured to carry out the method as explained above.

BRIEF DESCRIPTION OF THE DRAWINGS

Other features and advantages of the invention appear from the following detailed description of one of its embodiments, given by way of non-limiting example, and with reference to the accompanying drawings, in which.

DETAILED DESCRIPTION

In the figures, the same references denote identical or similar elements.

System Overview

Figure 1:
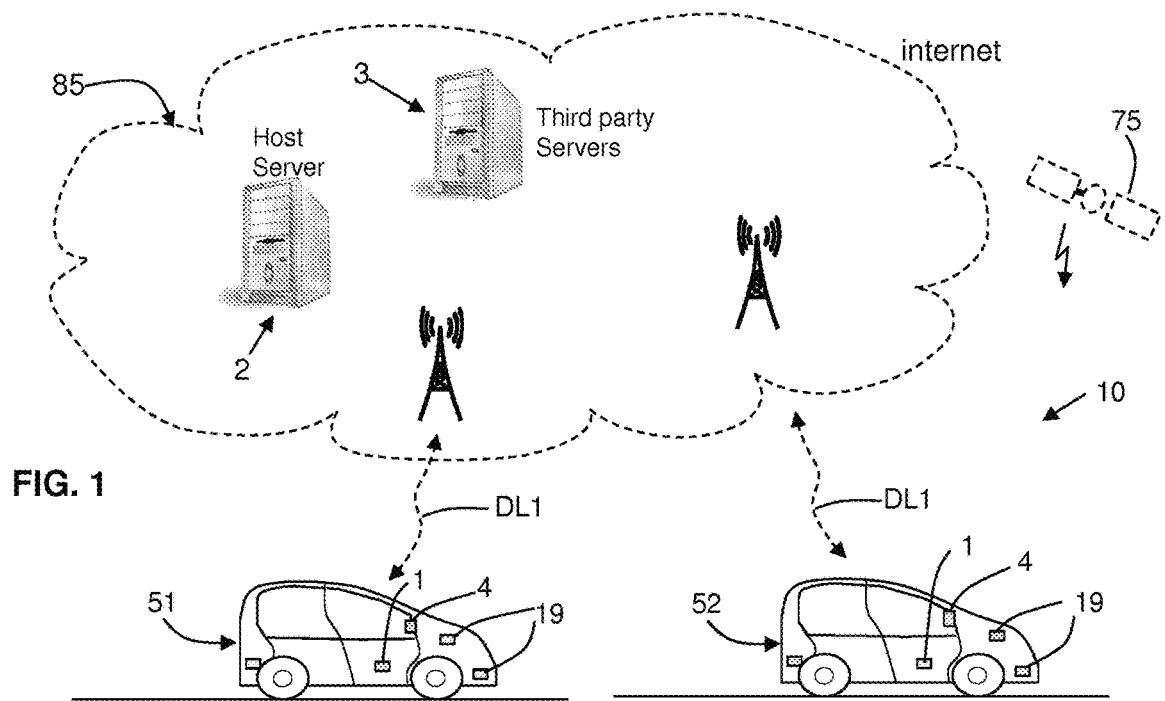
FIG. 1 illustrates a general layout of a system in which the mid-on according to the invention can be carried out.

FIG. 1 shows an exemplary system in which are used diagnosis PlugIn devices generally designated by reference numeral 1, and called more simply PlugIn device 1 in the following.

The system comprises at least a host server 2, and a plurality of third party servers 3. In addition, the host server 2 and the third party servers 3 are connected on the internet network, denoted by 85. There may be wired and wireless portions in the internet network.

Optionally, the system may comprise one or more diagnosis frame provider 25.

Further, the system comprises one or more user display device 4.

In the present document, the "user" U should be understood to denote either a driver UD and/or a owner UP of a vehicle of interest 51,52.

A plurality of vehicles 51,52 are to be equipped with such plug-in devices 1; in practice one plug-in device 1 is installed on one targeted vehicle. According to one option, all plug-in devices are identical before being installed on one particular vehicle. For that reason, they are also sometimes referred to as "universal dongle".

Targeted vehicles include any type of usual vehicles, namely sedans, trucks, convertibles, heavyweight vehicles, station wagons and so on. Any brand/make is taken in consideration. Also motorcycles are taken in consideration.

In addition, any type of powertrain solution is considered such as ICE (internal combustion engine), hybrid, full electric . . . .

Figure 2:
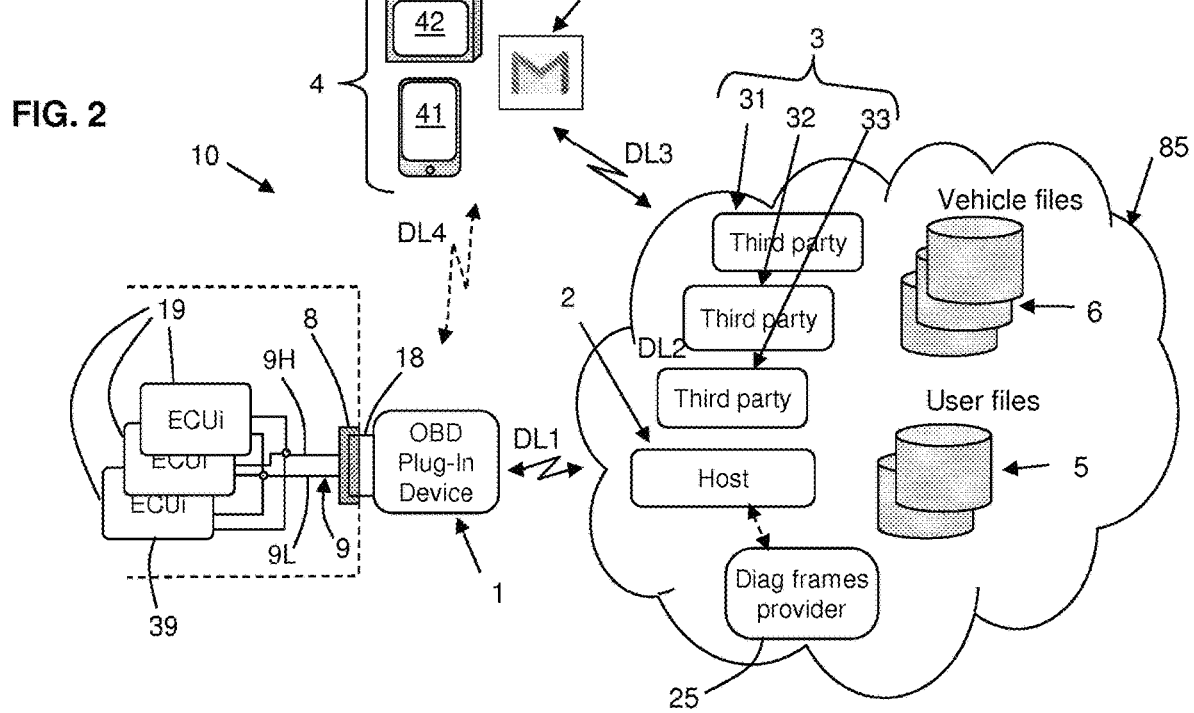
FIG. 2 is a diagrammatic view of the system with the electronic components.
Figure 3:
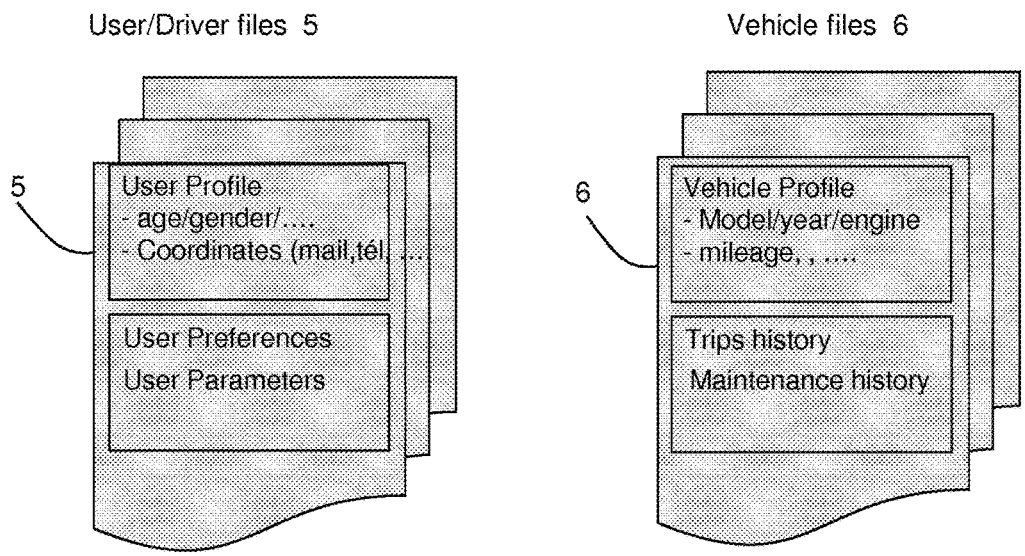
FIG. 3 is a diagrammatic view of the user files in the vehicle files.

With reference to FIGS. 1 to 2, each of the targeted vehicle 51,52 is equipped with on-board ECUs 19 and a diagnostics port 8 otherwise named OBD plug 8 or OBD connector. "OBD" stands for On Board Diagnostics. For heavyweight vehicles, motorcycles or some old passenger vehicles, the diagnostics port 8 is not necessarily a so-called "OBD port", it is generally a diagnostics port where a diagnostic tool ('Scan tool') can be coupled, notably for vehicle maintenance purpose. More generally the diagnostic port can be any interface in the vehicle where vehicle information can be collected either through diagnostic interaction or simply by reading and decoding vehicle information being exchanged between the different ECUs in the vehicle.

At one moment in the service life of the vehicle 51, a plugin device 1 is plugged onto the OBD port 8. Plug-in device 1 can be connected to the Diagnosis port 8 from the beginning. This is denoted step /a/ of the proposed method.

Each vehicle 51,52 comprises one or more on-board ECUs 19 with diagnostics functionality. One ECU (Electronic Control Unit) 39 may be in charge of ICE control functions including gases emissions control, another ECU may be in charge of braking/ABS/ESP functions, another ECU may be in charge of passive safety functions including airbags, another ECU may be the instrument panel with odometer and gauges, another ECU may be in charge of various body functions etc. . . . .

At least one ECU 19 is in charge of computing and making available fuel level remaining in the fuel tank. At least one ECU 19 is in charge of computing and/or collecting tire pressure either from tire pressure sensors or from analysis of accurate real time wheel speed sensors.

For Hybrid/electric vehicles, the engine ECU is substituted by an enlarged concept, namely a "powertrain" ECU. At least one ECU 19 is in charge computing and making available the battery state-of-charge ('SOC').

Each vehicle 51,52 has a unique VIN number. This VIN number allows to identify a vehicle without any ambiguity.

There is provided a first data link DL1 between the plug-in device 1 and the host server 2. There is provided a second data link DL2 between the host server 2 and the third party servers. There is provided a third data link DL3 between third party servers 3 and the user display device 4, either directly or passing via the host server 2. The third data link DL3 can be established between the host server 2 and the user display device 4.

There may be provided optionally a fourth data link DL4 between the plug-in device 1 and the user display interface 4.

Plug-in Device

The plug-in device 1 is sometimes called 'Dongle' or 'dongle unit'. The desired data is collected using messages on a serial bus (often CAN bus or J1850 or J1708 or sometimes K-line or Ethernet). Each vehicle manufacturer has its own messages definition. Practically, even each technical platform have its own messages definition (several commercial variants may be derived from one technical platform).

The wireless communication DL1 enables the plugIn device 1 to exchange data with a host server 2 which is located in one location remote from the vehicle, thanks to the wireless network flexibility. Each plugIn device 1 has at least a CAN bus interface 16, enabling to listen to at least one CAN bus 9 of the vehicle. Instead of CAN, the PlugIn device 1 may have a Ethernet bus interface.

In a particular case of the powertrain Can bus, there are two lines CAN-High 9H and CAN-Low 9L (cf FIG. 2) as defined in ISO 15765. The pinout of the OBD plug 8 is predefined, according to standard SAE J1962, it comprises 16 pins with particular allocation.

Instead of CAN highspeed, the interface between plugIn device 1 and on-board ECUs 19 can be made through J1939, CAN 250k, CAN single Line, Ethernet, K line ISO 9141, J1850 or other equivalent means. There may be provided two or more communication interfaces 16, 16a.

In one embodiment, the plugin device 1 can be specific to a manufacturer, or to a platform.

However, it is preferred that the plugin device 1 is intended to be 'universal', it contains cumulatively hardware/firmware/protocol handler for all the possible cases namely, CAN High speed, Ethernet, J1939, CAN 250k, CAN single Line, K line ISO 9141, J1850. For CAN High speed, it is referred to ISO 15765-4; for K-line, it is referred to the so called KWP2000.

In addition, optionally, each PlugIn device 1 may have a geolocation functionality 13, based on signal acquisition from GPS satellites 75 or the like, and calculation of geo position, as known per se. The term 'GPS' here is generic and includes Galileo™, Glonass™ and the like.

Each PlugIn device 1 may have an accelerometer 14, in complement to GPS in order to sense the vehicle movement.

Each PlugIn device 1 may comprise a backup battery 11 to allow storage of essential data whenever the vehicle battery is disconnected or whenever the PlugIn device 1 is disconnected momentarily. The PlugIn device 1 is intended to generally stay connected to the OBD plug 8, unlike the garage scan tool, which is plugged on the OBD plug only momentarily.

Figure 6:
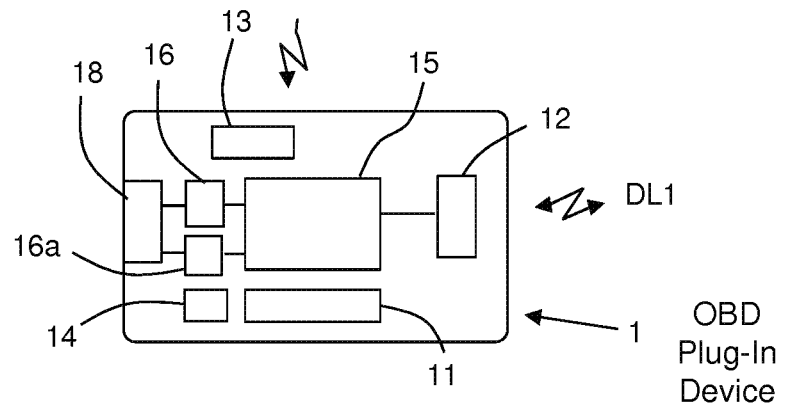
FIG. 6 shows an exemplary block diagram of the diagnosis PlugIn device.
Figure 7:
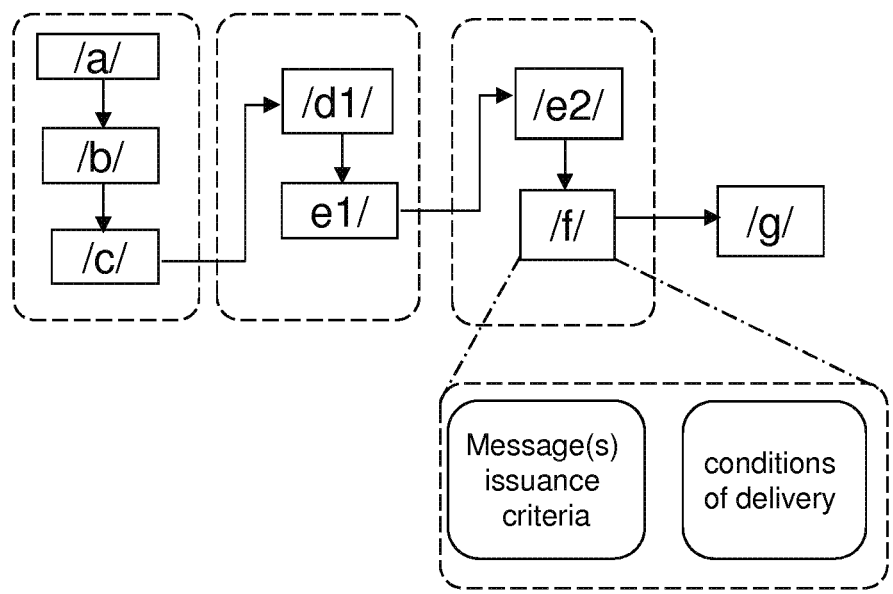
FIG. 7 illustrates an exemplary set of steps involved in the disclosed method.
Figure 8:
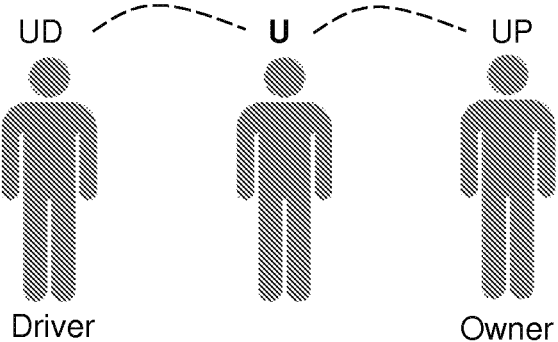
FIG. 8 illustrates different types of users.

Each PlugIn device 1 has wireless communication capability, with 3G, 4G, 5G, LTE, GPRS, V2X, WiFi standards or any like solution. As shown at FIG. 6, there is provided a wireless coupler 12, a microcontroller 15, a SIM card or similar device/function, a male connector 18. In most passenger vehicles, the connector 18 is a complementary counterpart of the OBD port 8 defined by SAE J1962. For some heavyweight vehicles, since there is no compulsory standard for the diagnostic connector, there is provided another method to establish the communication between the PlugIn device 1 and vehicle diagnosis bus, namely a ring/wire coupling. Therefore, coupling PlugIn device 1 to vehicle diagnosis bus can be done either by a conventional electrical contact fashion, or by a contactless ring/wire coupling.

This wireless communication coupler 12 enables the PlugIn device 1 to exchange data with a host server 2 which is located in one location remote from the vehicle, thanks to the wireless network flexibility via first data link DLL Plug-in device 1 is configured to collect and transmit various data like vehicle speed, fuel consumption, vehicle geolocation, etc, as will be seen later.

Figure 5:
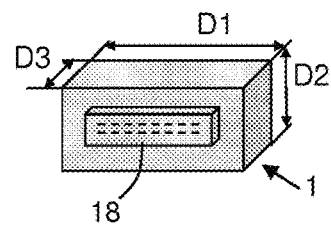
FIG. 5 illustrates the mechanical configuration of the diagnosis PlugIn device.

As apparent from FIG. 5, the plug-in device 1 is very small, typically less than 50 mm thick (D3) with regard to the length D1 and width D2 of the OBD plug. It is intended to be installed in a very small volume next to the OBD plug.

Small dimensions of the OBD plug-in device 1 can be D1<50 mm, D2<25 mm, D3<50 mm.

Plug-in device 1 has preferably no display, no user interface, preferably no switch. Plug-in device 1 may bear an identification label for quality and traceability purposes. Plug-in device 1 may have a Bluetooth or NFC interface. Plug-in device 1 may have a micro USB port.

Host Server & User

The host server 2 serves as front end proxy for the whole flow of information from the vehicle to the third parties.

The user U is defined as a driver UD and/or a owner UP of a vehicle of interest 51.

Thanks to vehicle identification (VIN or other) and user subscription, the host server 2 manages a table of correspondence between vehicles and users.

Note: the host server 2 can be formed as a set of servers in a cloud architecture. Also, the third party servers 3 can be formed as a set of servers in a cloud architecture.

Basic Data Set

There is defined a basic data set 7 comprising on the one hand vehicle parameters and on the other hand route data.

The vehicle parameters of the basic data set 7 include at least vehicle speed made available by at least one on board ECU 19. The basic data set 7 also includes preferably one or more information about a current driving cycle, including for example engine running, IGNition ON or OFF, vehicle moving or at standstill.

It is noted that vehicle speed made available by at least one on board ECU 19 can be correlated by a second vehicle speed (confirmation) computed from the GPS signals made available in the plug-in device 1.

The basic data set 7 can further comprise, in the vehicle parameters, fuel level, fuel consumption, engine temperature, vehicle mileage, diagnosis trouble codes (DTCs), brake pads wear.

The basic data set 7 can further comprise driving style, namely braking force rating and acceleration rating. A driving style rating from 1 to 10 can be defined from the softer driving style (braking anticipation and smooth acceleration) to the most sporty driving style (strong braking and strong acceleration). This rating can be taken into account by the insurance company since accident likelihood is known to be somehow proportional with the above rating. The driving style is generally correlated with the fuel consumption, therefore fuel consumption can be an additional parameter to output the driving style rating.

According to the features present in the vehicle, the basic data set vehicle parameters can further comprise tires pressure for each tire, estimated tire wear for each tire.

According to an option, the basic data set 7 can further comprise information about next service operation which is required and mileage at which it is to be performed or mileage remaining to this service deadline.

According to the powertrain type of the vehicle, if the vehicle is electric or hybrid the basic data set 7 can further comprise traction battery state-of-health, and likewise the basic data set 7 can further comprise the traction battery state-of-charge.

The route data of the basic data set 7 includes at least itinerary and geolocations.

Said itinerary and geolocations can be collected from on board ECUs 19 or computed locally with the electronic components arranged within the PlugIn device 1.

Said itinerary can be defined as a series of geolocations (GPS coordinates).

In one variant embodiment the series of geolocations is a series of time-stamped geolocations (GPS coordinates+ timestamp). In one variant embodiment the series of geolocations can comprise additionally the driving speed at the geolocations and the average driving speed in each segment of the itinerary, for example the average driving speed in each segment between recorded geolocations of the itinerary.

The route data, as broadly defined, can comprise the vehicle actual itinerary but also the position and duration of the time sequences when the vehicle is at standstill, even parked for a short or long time.

Regarding information collected from one or more vehicle bus(es), information can be collected as raw data and is transformed into meaningful information either locally within the PlugIn device 1, or with the help of the diagnosis frame provider 25.

Information can be collected from one or more vehicle bus(es), either from free running frames, or upon request/answer process actively initiated from the PlugIn device 1.

Collection of data at the PlugIn device 1 is denoted step /b/ of the proposed method.

Diagnosis Frame Provider 25

Figure 9:
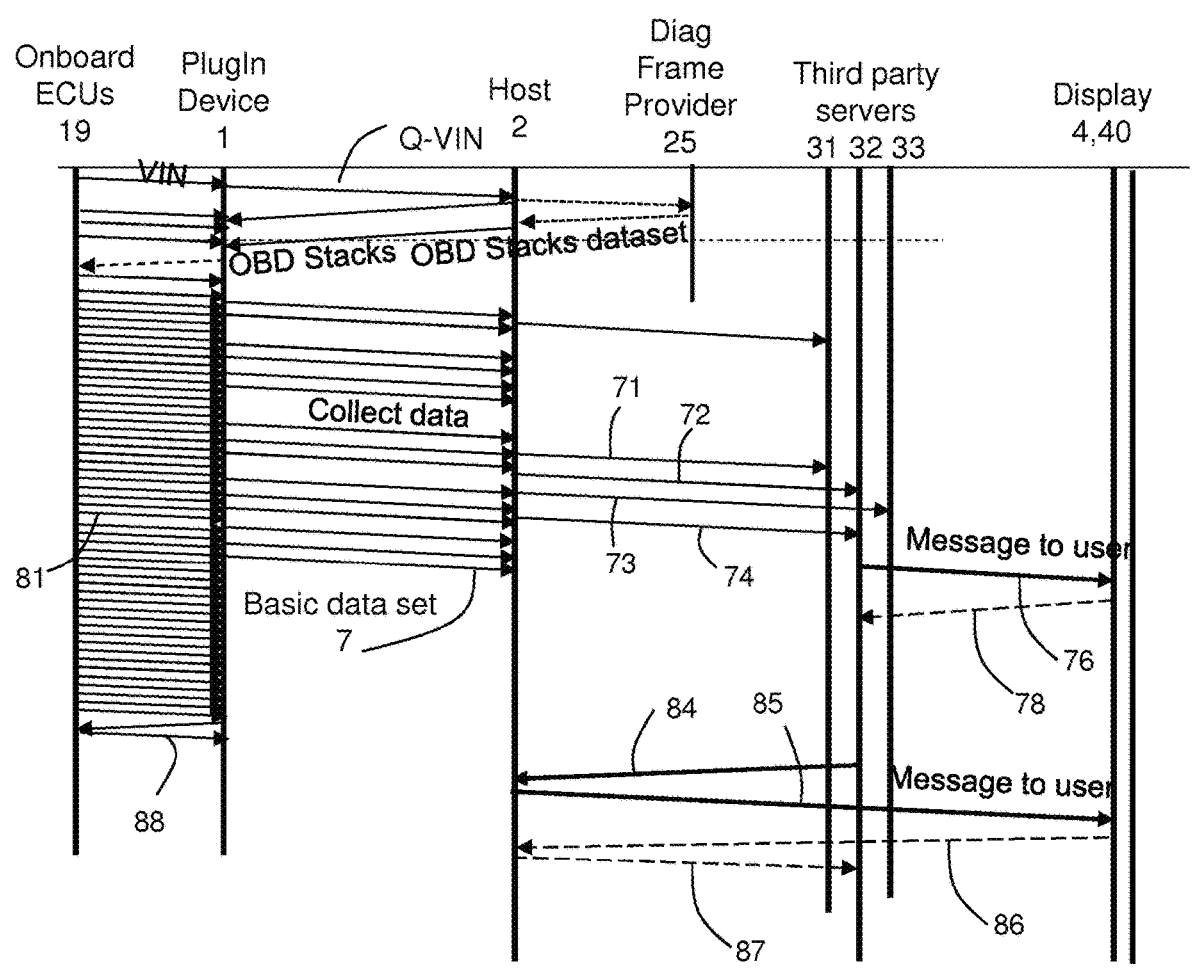
FIG. 9 is similar to FIG. 4 and illustrates a variant involving a diagnosis frames provider.

As depicted at FIGS. 2 and 9, in the system 10, there may be also provided one or more diagnosis frame provider 25, otherwise called "diagnostics database suppliers" 25.

Diagnostics database suppliers 25 can be private specialized companies, diagnostics database suppliers 25 can also be one service provided by the vehicle manufacturer itself like FORD™ VW™ TOYOTA™, NISSAN™, GM™, RENAULT™, FIAT™, BMW™, VOLVO™, AUDI™, etc. . . . .

Diagnostics database suppliers 25 knows, for each technical platform from several manufacturers, the set of available diag services, which are otherwise designated by "Diagnosis stacks dataset". The host server 2 may have recourse to several diagnostics database suppliers whenever the data is not available on one of them, the host server 2 turns to another one.

Diagnosis stacks dataset define access methods, useful bus(s) and available diag services, with their respective codes, controls, expected answers with decoding scheme. ISO 15031 defines the minimum services and questions/answers that have to be supported.

Said otherwise, Diagnosis stacks dataset comprises all available request/answer services for one or more "vehicle type" and the hardware access method.

Diagnostics database supplier 25 may include a VIN decoder service; this is useful to derive vehicle basic particular otherwise designated by Make/Model/Year/Engine.

Third Parties

Generally speaking, a large number of third party companies can be involved in the promoted method.

Among them, there can be technical third parties, and business third parties.

For example, one third party can be a tire manufacturer; whereby, precise knowledge of the wear condition of the tires can be deduced from the information collected by the plug-in device 1 uploaded to the server of the tire manufacturer; also behaviour of the tires at the ground contact can be induced and this information can be made available to the driver or the fleet manager According to another example, one third party can be a tire resale company; A wear index can be forwarded to the tire resale company server; the server can therefrom propose a tire replacement offer to the user, depending on the availability of the appropriate tire type, and opening hours of the nearby resale shop.

One third party can be an insurance company; therefore, insurance company can have precise knowledge of the actual use of vehicle and adapt therefrom the insurance fare. The insurance fare can thus be made dependent on the driving style and more particularly on the driving style rating mentioned above.

One third party can be a second hand vehicle pricing company ('Argus' ™ or the like). In this case, the second hand vehicle pricing company can collect along the life of the vehicle various information like how long the vehicle has been used, how often the driver has started the engine, how often the vehicle was driven with a cold engine, how often the vehicle has undergone freezing or icing conditions, how long the vehicle has been exposed to very hot conditions, how long the vehicle has been parked indoors, how long the vehicle has been parked outdoors. The collection of this data gives an image of the general ageing of the vehicle, more relevant than the conventional mileage. Consequently, the market value given to the vehicle is really personalized and reflect precisely the real state of the vehicle.

One third party can be a vehicle renting website. For example a C-to-C (customer to customer) vehicle renting website ('Drivy' ™ or the like). The time-stamp use profile of the vehicle may reveal that the vehicle is not used at all every Monday. Therefore, the vehicle renting website can prompt a message to the user, proposing a renting opportunity to another potential user. The vehicle renting website can therefore easily bind vehicle owners with people looking for renting vehicles, with high relevance.

According to another example, one third party can be a parking lots operator. For example, the basic data set may reveal that a driver is seeking to park in a busy city borough, itinerary showing loops around one or more particular block. The host server can forward such information to a parking lots operator, the latter can send a parking place offer to the driver in a nearly real time fashion.

According to another example, one third party can be a service centre performing regulatory periodic vehicle check. In this case, the message may concern an approaching deadline to perform a maintenance operation on the vehicle, including regulatory compulsory service check.

According to another example, one third party can be a driving license authority. Particularly in the case of points-based driving licenses, the plug-in device 1 or the host server 2 can assess the driving style of the driver and forward this information to the driving license authority third party, which might consequently increase or decrease the number of points on the points-based driving license of the driver at stake. Also the behaviour of the driver at the crossroads (compliance with traffic lights and STOP signs) can be included in the driving style for driving license purpose.

According to another example, one third party can be a company car website calculating a partition between the travels done for work purpose and the travels done for private or leisure. Reports to user company accounting department is made easier since work based travels are separated from private or leisure travels.

According to another example, one third party can be a repair centre (Norauto ", Speedy" or the like), which is particularly interested in knowing DTCs that may occur at vehicle around the place. The repair center can therefore propose an offer to repair the trouble.

According to another example, the third party can be a goods trading company with on-site delivery such as Amazon™. In this case, the basic data set can further advantageously comprise information about ability to open the trunk of the vehicle with a private or encrypted method. In this case remote unlocking (or even opening) of the vehicle trunk enables to support features such as "Amazon Flex™", namely secure delivery of goods in the trunk of the user's car at any time including whenever the user is away from his vehicle.

Each third party can handle separately its own user(s) files and the vehicle files. Alternately some (or all) third parties can rely on common user(s) files and/or common vehicle files.

Message Issuance Criteria & Conditions of Delivery

At step /c/, basic data set 7 is forwarded from the PlugIn device 1 to the host server 2. Some part(s) of the basic data set 7 can be under a raw form or some part(s) of the basic data set 7 can be under a meaningful form.

At step /d1/ the host server can enrich a driver profile relating to the driver of interest and update the vehicle data history of the vehicle of interest; which is cumulative data. From this vehicle data history, as described later, the driver behavior is analyzed and predictions can be made about future travels of this vehicle.

At step /e1/, part or all the basic data set 7 is forwarded from the host server 2 to the third party servers 31, 32, 33. The information transmitted from the host server 2 to the third party servers 31, 32, 33 can also comprise a higher level information, like for example the driving style rating.

Advantageously, the basic data set can be rendered anonymous, i.e. the driver's name and personal data is replaced by dummy data or by void fields. Only data for statistical purpose is therefore transmitted to third parties.

Also it is possible to trace any third party server access to basic data set, i.e. any third party accesses are logged and made available to the user U for each occurrence when the server has requested and/or received all or portion of basic data set. Thereby the user U (driver US or owner UP) has the possibility to update the opt-in or opt-out selection/choice/option, in response to third party behavior. Update can be done selectively for each third party.

Advantageously, an integrity securing mechanism is carried out to secure data integrity. A blockchain mechanism can be carried out, or a cryptographic method can be carried out, or likewise a tangling method can be carried out, or any similar method.

Such integrity securing mechanism is carried out from transferring information from host server 2 to third party servers 3 and/or for the whole data path from the diagnosis plug-in device 1 to the third party servers 3. Thereby data hacking and spoofing can be prevented.

At the third parties, in view of the examples given above, information received from the host server is processed in order to make a decision to build a relevant message for the user, together with conditions of delivery of this message (this is step /f/ of the method).

At the third parties servers, there is provided a message issuance engine, working on a large amount of data, coming from the vehicle of interest and from all over internet and local databases; Such message issuance engine is advantageously based on neural network arrangement.

Generally speaking, the message may comprise a vehicle maintenance message and/or advertisement message.

At each third party, the decision to build a relevant message is based a set of message issuance criteria. Said set of message issuance criteria includes a user profile authorization profile to receive messages for said particular third party.

In practice, a message will be issued toward a user only if this user has accepted to receive messages from this third party. Therefore, only willing users will received unsolicited messages.

More particularly, there is provided an application accessible to the user display device where the user can opt-in or opt-out for the variety of proposed services.

There may be provided additionally a general opt-in or opt-out feature for transmitting data set to third parties.

The user can change use configuration at any time, or the user can make this configuration dependent on the time of the day, on the geolocation, etc. . . . .

The set of message issuance criteria may further include lookup tables and/or abacus to improve the relevance of each message with regard the user (owner and/or driver). The set of message issuance criteria may further include at least one of the following information: vehicle current position, fuel level, vehicle age, vehicle mileage, vehicle brand, vehicle powertrain type.

It is noted that the message issuance engine is configured to filter the possible messages according to one the above mentioned information. For example vehicle powertrain type is used to filter the maintenance offer with regard to the vehicle powertrain type, so only relevant messages can be sent to the user. As a basic example, engine oil service is not relevant to a full electric vehicle. Also the optional equipment is taken into account; a navigation map update offer message is not relevant if the vehicle does not carry a navigation feature; An air conditioning fluid refill offer is not relevant if the vehicle does not carry an air conditioning feature.

For example, still referring to the tire management, a lookup table containing each tire size/type per each brand/model/powertrain is provided. This allows a tire resaler ('dealer') to know which type of tire can be fitted to each vehicle of interest.

According to another example, brake pads wear is compared with regard to an abacus, and a service shop center can promote replacement of brake pads only if the abacus comparison gives a relevant output.

Another example of using abacus relates to the fuel consumption. The host server or one third party server can used an abacus exhibiting expected fuel consumption versus cruising speed for a large number of vehicle type (this denotes in part the aerodynamic performance).

According to another example, according to the fuel (respectively Electrical energy) remaining quantity in the tank (respectively in the main battery) is compared in lookup table to deduce distance autonomy available before next refueling. From this information, roadside service stations can build message(s) to attract driver(s) to their place to proceed to refilling (respectively battery recharge).

The conditions of delivery of this message includes vehicle current geo-position, vehicle current status, time of the day, weather conditions, acknowledgement of previous message.

As an example, if the vehicle is travelling on a motorway, the geo-position is important, since it is of no use to send a message to the driver about a roadside service station which is currently situated behind the vehicle and not anymore ahead of the vehicle.

According to another example, if service centre is about to close, the delivery of the message can advantageously be postponed until the service is open again.

According to another example, winter snowy conditions forecast may prompt delivery of winter tire offers to user(s).

According to another example, hot temperature forecast may prompt delivery of invitation to check AC or to check convertible function in a service center.

Therefore, even though third party server engine has issued a message to the user of interest, the actual delivery can be delayed until the best condition to deliver the message are met.

Exemplary Message Sequence

Figure 4:
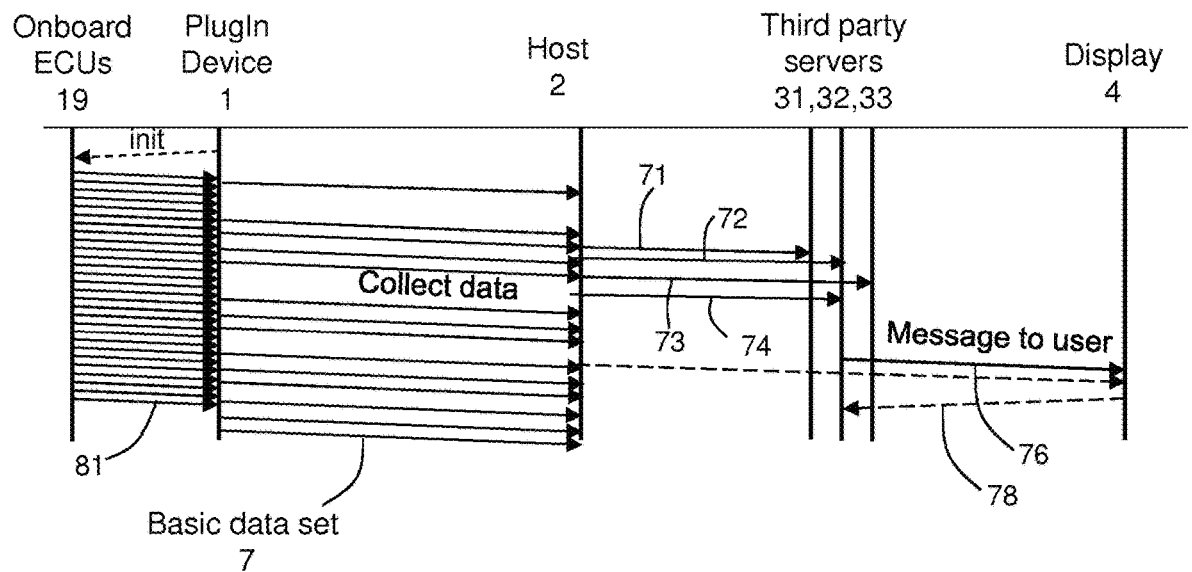
FIG. 4 illustrates a logic chart of data collection flow and user messages.

As shown at FIG. 4, the plug-in device 1 typically initiates communication with onboard ECU 19 at each new driving cycle. In particular, the plug-in device 1 reads and decodes the free running frames 81 circulating on the diagnosis bus 9.

Then, periodic collection of basic data set 7 is carried out. As mentioned above, the basic data set comprises data collected on the diagnosis bus 9 and data sensed by the electronic components arranged inside the plug-in device 1, like the GPS functionality or accelerometer for example.

Then the basic data set 7 is sent to the host server 2. Whenever the connection is not available the plug-in device is able to store momentarily the data and send it later the host server 2.

Then, uplink messages are sent from the host server 2 to the third party servers 31, 32, 33. In these uplink messages, there can be low level messages 71 72 73 which are a copy of part or all the basic data set.

In these uplink messages, there can be medium or high level message 74, like for example "vehicle 51 is seeking a parking position" or "U has just moved from city A to city B" or "U has taken a new job position and go to a new workplace".

Whenever a message is built and the conditions of delivery are met, a message 76 is sent to the user. The user can then view the message on the user display device 4. Whenever relevant, an acknowledgment message 78 can be sent back to the third party that issued the message and optionally to the host server 2.

The message to user can be for example "there is a parking position available at Street XX" "Service center ZZ has a special offer on winter tires" "Somebody would be interested to acquire your vehicle at YYYYY $".

As shown at FIG. 9, the initiation phase is more detailed whenever the vehicle is not already known from the plug-in device 1. In such case, the plug-in device catches (or request) the VIN number from a ECU. The plug-in device can additionally refer to a diagnosis frame provider 25 with the VIN and/or with the Make/Model/Year/Engine. In this case, the above mentioned OBD Stacks are received from the diagnosis frame provider 25.

The diagnosis frame provider 25 can also be used to decode some raw data read on the bus.

FIG. 9 also shows that for some information, a request answer process 88 may used to collect data from the onboard ECUs.

Also, as shown at FIG. 9, the message emitted from the third party servers 31, 32, 33 may transit via the host server 2. In this case, a message 84 built at third party server 32 is transmitted to the host server 2; the host server 2 forwards this message to the user display device 4 (arrow denoted 85) if so designed. Conditions of delivery of messages discussed above can be handled at the host server 2 level.

The acknowledgment (or offer acceptance) can also transit via the host server 2; namely a first ACK message (or offer acceptance) 86 is sent from the user display device 4 (or the mailbox 40) and a second ACK message 87 is sent from the host server 2 to the third party server 32.

User Files/Vehicle Files

At the host server and/or at the third party servers, one or more user file 5 for a particular user is handled.

The user file may usually comprise:
age/gender/etc, generally known as 'demographics'
Coordinates (email address, telephone n°, . . . )
The user file may also comprise User Parameters & preferences.

The user file may also comprise opt-in and opt-out selection for each available service.

The user file may also comprise a general opt-in and opt-out option to authorize sending data to third parties.

According to the case, there may be two distinct files: a driver UD file and a owner file UP. In some cases there may be several driver files for a particular vehicle (multi-user case).

For either driver UD file or owner UP file, the profile may comprise:
Home Neighborhood (average HHI, average family size . . . )
Brand affinities
Lifestyle
The user file may also comprise:
current destination (home, work, gas . . . ),
usual destinations (home, work, gas . . . ),
Emotional status (looking for a parking spot, late . . . ), like current nervous rating from 'zen' to excited and or anxious, this may 2 or more dimensional As already mentioned, user data is in the first place circumscribed into the host server 2. Unless agreed otherwise by the user (option to be approved), the basic data set for third parties is rendered anonymous, i.e. the driver's name and personal data is replaced by dummy data or by void fields for outwards communication. Under such conditions, no privacy data is transmitted to third parties, and compliance with general data protection regulation ('GDPR') is achieved.

At the host server and/or at the third party servers, one or more vehicle file 6 for a particular vehicle is handled.

The Vehicle Profile comprises static information and dynamic cumulative information.
In the static section, we find at least:
Make/Model/Year/Engine,
VIN,
OEM options,
In the dynamic cumulative section, we find:
current mileage,
current fuel level, or battery SOC,
current location,
Trip/travel history, with time-stamped data
current status of doors, trunk, tank, roof, etc.
Maintenance history
current tire wear, brake pad wear, wiping blade wear, etc.
User/driver files 5 and vehicle files 6 can be located in a common repository. According to another option, each of the third party and the host server will house user/driver files 5 and vehicle files 6, which can be specific to the third party in this case.

User Display Device

In one example, the user display device 4 is a smartphone 41. The user may receive a message as a SMS. Alternately, the user may receive a message as an email in a mailbox like Gmail™ 40 or the like. The user may review such email from his/her smartphone. The user display device 4 can also be a phablet or a tablet.

Alternately, the user may receive a message on a vehicle onboard multifunction display 42. Such onboard multifunction display can be part of the instrument panel or can be part of the center console.

Optionally, the messages sent to the user can be sent in parallel both to the smartphone 41 and to the vehicle on-board multifunction display 42.

Miscellaneous

The host server 2 may comprise a driver profile module and a behavioral analysis module, a plurality of vehicle history files, a plurality of user profile files and user profile groups, a plurality of vehicle type reference database.

The basic data set can be complemented with additional feature. The plug-in device may handled an auxiliary data set required on demand from a third-party 31.

Although the description above was given for one particular vehicle of interest, it should be understood that the host server 2 receives data from a plurality of plug-in device 1. In practice the host server 2 will receive data from a large number of vehicles, hundreds or even thousands in practice. In on embodiment, the one or more host server(s) 2 are advantageously configured to receive data from at least 10,000 vehicles.

Likewise, the one or more host server(s) 2 will forward data relative to this large number of vehicles to the third party servers 31, 32, 33. Therefore, the third party servers are configured to run message issuance engine concerning this large number of vehicles, in a simultaneous fashion.

It should be noted that the messages transmitted from the host server to the third party servers can be financially rewarded.

The invention claimed is:

1. A method carried out in a system, the system comprising at least a host server, a plurality of third party servers and at least a user display device, wherein the user is defined as a driver and/or a owner of a vehicle of interest,
   with a first data link between the diagnosis plug-in device and the host server, a second data link between the host server and the third party servers, and a third data link between the host server and or the third party servers and the user display device,
   the method comprising the following steps:
   /0/ provide at least a diagnosis plugin device, the diagnosis plugin device comprising a connector being a complementary counterpart of an On-Board Diagnostics (OBD) port,
   /a/ connect the diagnosis plug-in device to the OBD port of the vehicle of interest, said vehicle of interest being usually driven by a driver of interest,
   /b/ collect, over time, at the diagnosis plug-in device, a basic data set comprising vehicle parameters and route data, the basic data set including at least vehicle speed, itinerary and geolocations,
   /c/ transfer the basic data set to the host server,
   /d1/ at the host server, enrich a driver profile relating to the driver of interest and update the vehicle data history of the vehicle of interest,
   /e1/ forward a respective portion of the basic data set from the host server respectively to each of the plurality of third party servers, /e2/ at the third party servers, enrich a third party driver profile and/or update a third party vehicle data history of the vehicle of interest, /f0/ define a set of message issuance criteria including a user profile authorization profile to receive messages for said particular third party, wherein said user profile authorization profile comprises opt-in and opt-out selection for each available service or each particular third party, /f/ at each particular third party server, make a decision, based on said set of message issuance criteria, to build an unsolicited message for the user and conditions of delivery of this message, said message comprising a vehicle maintenance message and/or advertisement message, /g/ send, when conditions of delivery are met, said unsolicited message to the user display device or to a user mailbox accessible by the user via the user display device.

2. The method of claim 1, wherein the set of message issuance criteria further includes lookup tables and/or abacus, and at least one of the following information: vehicle current position, vehicle age, vehicle mileage, vehicle brand, vehicle powertrain type.

3. The method of claim 1, wherein the conditions of delivery of this message includes vehicle current geo-position, vehicle current status, time of the day, weather conditions, acknowledgement of previous message, geolocation of the user.

4. The method of claim 1, wherein the basic data set further comprises driving style (braking force, acceleration), fuel level, fuel consumption, engine temperature, vehicle mileage, diagnosis trouble codes (DTCs), tyres pressure, brake pads wear, traction battery state-of-health, traction battery state-of-charge, next service required.

5. The method of claim 1, further comprising:
/b2/ collect, at the diagnosis plug-in device, an auxiliary data set required on demand from a third-party.

6. The method of claim 1, wherein the message concerns an approaching deadline to perform a maintenance operation on the vehicle, including regulatory compulsory service check.

7. The method of claim 1, wherein the message concerns an advertisement about vehicle general running costs, like insurance, tolls, parking fees, overall cost of ownership, fuel.

8. The method of claim 1, wherein the message concerns an advertisement about special promotional business offer.

9. The method of claim 1, wherein the user display device is a smartphone.

10. The method of claim 1, wherein the user display device is a vehicle onboard multifunction display.

11. The method of claim 1, wherein the basic data set is rendered anonymous, i.e. the driver's name and personal data is replaced by dummy data or by void fields.

12. The method of claim 1, wherein the method further comprises:
trace any third party server access to basic data set, i.e. third party accesses are logged and made available to the user for each occurrence when the server has requested and/or received all or portion of basic data set.

13. The method of claim 1, wherein the method further comprises:
carry out an integrity securing mechanism from transferring information from host server to third party servers and/or for the whole data path from the diagnosis plug-in device, to the third party servers.

14. A system comprising at least a diagnosis plug-in device, at least a host server, a plurality of third party servers and at least a user display device, wherein the user is defined as a driver and/or a owner of a vehicle of interest, with a first data link between the diagnosis plug-in device and the host server, a second data link between the host server and the third party servers, and a third data link between the host server and or the third party servers and the user display device, the system being configured to carry:
/0/ provide at least a diagnosis plugin device, the diagnosis plugin device comprising a connector being a complementary counterpart of an On-Board Diagnostics (OBD) port, /a/ connect the diagnosis plug-in device to the OBD port of the vehicle of interest, said vehicle of interest being usually driven by a driver of interest, /b/ collect, over time, at the diagnosis plug-in device, a basic data set comprising vehicle parameters and route data, the basic data set including at least vehicle speed, itinerary and geolocations, /c/ transfer the basic data set to the host server, /d1/ at the host server, enrich a driver profile relating to the driver of interest and update the vehicle data history of the vehicle of interest, /e1/ forward a respective portion of the basic data set from the host server respectively to each of the plurality of third party servers, /e2/ at the third party servers, enrich a third party driver profile and/or update a third party vehicle data history of the vehicle of interest, /f0/ define a set of message issuance criteria including a user profile authorization profile to receive messages for said particular third party, wherein said user profile authorization profile comprises opt-in and opt-out selection for each available service or each particular third party, /f/ at each particular third party server, make a decision, based on said set of message issuance criteria, to build an unsolicited message for the user and conditions of delivery of this message, said message comprising a vehicle maintenance message and/or advertisement message, /g/ send, when conditions of delivery are met, said unsolicited message to the user display device or to a user mailbox accessible by the user via the user display device.

* * * * *